W. H. THIEMER.
UNIVERSAL JOINT.
APPLICATION FILED JUNE 20, 1919.

1,411,069.

Patented Mar. 28, 1922.

Inventor,
William H. Thiemer,
By Hull, Smith, Brook & West
Attys.

UNITED STATES PATENT OFFICE.

WILLIAM H. THIEMER, OF CLEVELAND, OHIO, ASSIGNOR TO THE PETERS MACHINE & MANUFACTURING COMPANY, OF CLEVELAND, OHIO, A CORPORATION OF OHIO.

UNIVERSAL JOINT.

1,411,069.   Specification of Letters Patent.   Patented Mar. 28, 1922.

Application filed June 20, 1919. Serial No. 305,644.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints, and more particularly to the means for assembling and lubricating the same. The invention may be defined generally as consisting of the details and combinations of elements whereby these results are effected.

Figure 1:
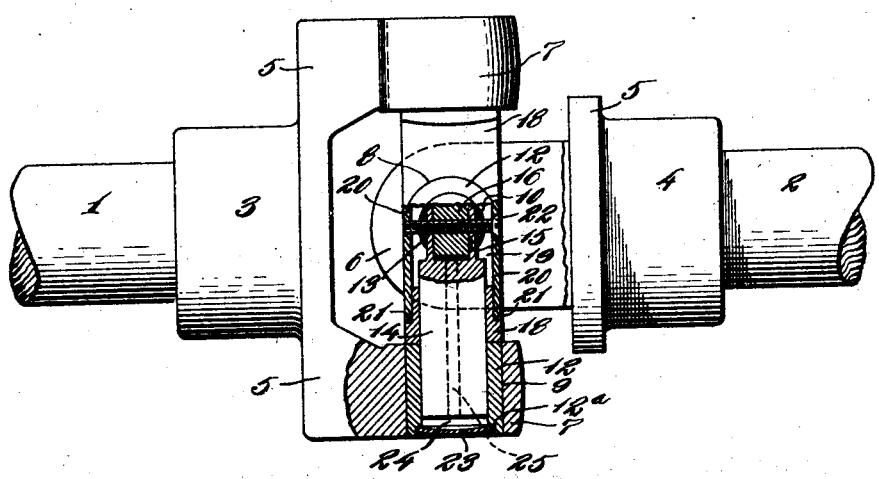
Figure 2:
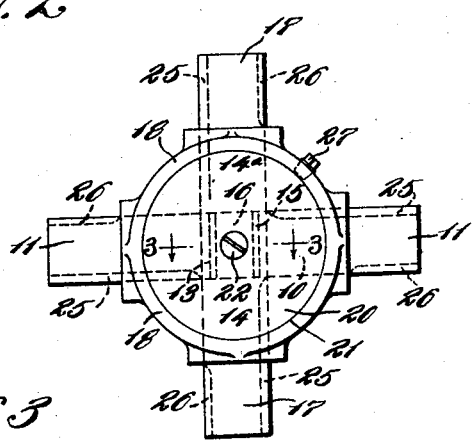

In the drawings forming part hereof, Fig. 1 represents a sectional elevation of a joint constructed in accordance with my invention, together with the ends of the shaft sections united thereby; Fig. 2 a detail in elevation of the connecting member; and Fig. 3 a sectional detail corresponding to the line 3—3 of Fig. 2.

Describing the various parts by reference characters, 1 and 2 denote the shaft sections which are to be united by the universal joint, each section having secured to one end thereof a hub, indicated at 3 and 4. Each hub is provided with a supporting base or flange 5.

Each of the supporting bases is provided with bearing blocks 6 and 7 respectively, each bearing block having a bore therethrough, indicated at 8 and 9, respectively.

The connecting member is of the cross type and comprises a pair of trunnion pins, one of which extends through and at right angles to the other, with a ring providing about the intersecting portions of such pins a lubricant receptacle from which the lubricant may be distributed by centrifugal action to the bearings.

One of the pins 10 is a continuous pin the ends 11 whereof constitute trunnions, the trunnions being mounted within bushings 12 mounted in the bores of the bearing blocks. At its central portion, the pin 10 is provided with an aperture 13, preferably cylindrical, for the reception of the overlapping ends of the other pin. The other pin comprises two members 14 and 14ª, the member 14 having an annular shell extension 15 adapted to fit within the bore 13 and to receive therewithin a cylindrical stud 16 provided at the inner end of the member 14ª. The ends of the pin members 14 and 14ª constitute the other pair of trunnions 17.

Figure 3:
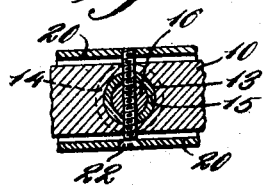

Cooperating with the cross pins is a ring 18 having four cylindrical openings for and fitting closely about said pins and having a central well 19 for lubricant shown as closed by plates 20 fitting within annular seats 21 and connected at their central portions by a bolt 22 which also serves to connect the cross pins, extending through the central portions thereof, as will appear by reference to Figs. 1 and 3.

The trunnions of the two pins are identical in construction and are mounted in the same manner within their respective journals. When assembled, the outer end of each trunnion terminates short of the outer end of its bushing 12, the outer end of the bushing being preferably flush with the outer surface of its bearing block and having an annular recess 12ª for the reception of a plate 23, which may be of the "Welch plug" type and sprung into said seat. By this construction, the trunnions and bushings are located entirely within the outer surfaces of their respective bearing blocks and there is provided beyond the outer end of each trunnion a well 24 for lubricant. For the purpose of distributing lubricant from the central well to the journals, the pins are provided each with a port 25 extending from the inner central portion thereof outwardly to the well 24 and each trunnion is provided in addition with a port 26 extending inwardly from the outer end thereof and adapted to conduct lubricant from its well 24 to the interior of its bushing 12. Lubricant may be conveniently supplied to the well 19 by means of a filling aperture extending through the outer wall of the ring and provided with a removable plug 27.

The joint may be assembled by inserting the ring between the bearing blocks, with its openings in register with the bores of said blocks, slipping the pin 10 in place, inserting the members 14 and 14ª of the other pin, connecting the intersecting portions of the pins and the cover plates by the bolt 22, inserting the bushings 12, and springing the plugs 23 therewithin.

Having thus described my invention, what I claim is:—

1. The combination, with a pair of shaft sections each having a pair of bearings, of a connecting member having openings adapted to register with said bearings, a pair of pins mounted in the openings of said member and having trunnions for said bearings, a bushing in each bearing surrounding the trunnion therein and extending beyond the outer end of its trunnion, the said bushings having each an annular seat beyond its trunnion, a plate sprung into said seat and forming a well beyond the end of said trunnion, a lubricant well in said member and means for conducting lubricant from said well to the wells provided within the bushings.

2. The combination, with a pair of shaft sections each having a pair of bearings, of a connecting member having openings adapted to register with said bearings, a pair of pins mounted in the openings of said member and having trunnions for said bearings, a bushing in each bearing surrounding the trunnion therein and extending beyond the outer end of its trunnion, a plate forming with the bushing a well beyond the end of said trunnion, a lubricant well in said member, and means for conducting lubricant from said well to the wells provided within the bushings.

3. In a universal joint, the combination, with a pair of shaft sections each having a pair of bearings, of a connecting member having openings adapted to register with said bearings, a continuous pin slidably mounted in one pair of openings of said member and having a central bore therethrough, a pin member mounted in one of the other openings of the connecting member and having a shell mounted in said bore, a pin member mounted in the remaining opening of the connecting member and having a projection mounted within said shell, and means for connecting the intersecting portions of the said pin and pin members.

4. In a universal joint, the combination of a pair of shaft sections each having a pair of bearings, a connecting member having a central well for lubricant and intersecting pins having trunnions for said bearings, a bushing in each bearing surrounding and projecting beyond the outer end of the trunnion therein and provided with a well beyond such trunnion, and means for conducting lubricant from the central well of the connecting member to each of the wells within a bushing and thence to the bearing formed between each trunnion and its bushing.

5. In a universal joint, the combination of a pair of shaft sections each having a pair of bearings, a cross member provided with openings adapted to register with said bearings, pins intersecting at their central portions at the center of said member and mounted in the openings thereof and provided with trunnions for said bearings, cover plates for the central portion of said member adapted to provide a central lubricant well therein, a bolt connecting said cover plates and the intersecting portions of said pins, and means for conducting lubricant from said well to said bearings.

In testimony whereof, I hereunto affix my signature.

WILLIAM H. THIEMER.